United States Patent [19]
Lucier et al.

[11] 3,902,740
[45] Sept. 2, 1975

[54] MOTORCYCLE ENGINE GUARD ASSEMBLY

[75] Inventors: Louis L. Lucier, Somerdale, N.J.; Bren Moran; Leslie Alden, both of New York, N.Y.

[73] Assignee: Cycle Service Center, Inc., New York, N.Y.

[22] Filed: Feb. 13, 1974

[21] Appl. No.: 442,180

[52] U.S. Cl................................ 280/289; 180/33 A
[51] Int. Cl.²......................................... B62J 23/00
[58] Field of Search............ 180/33 R, 33 A, 35, 30; 280/289, 291

[56] References Cited
UNITED STATES PATENTS

| | | | |
|---|---|---|---|
| 2,126,752 | 8/1938 | Devine et al.................. | 280/289 |
| 2,171,042 | 8/1939 | Minton........................ | 280/289 UX |
| 3,783,961 | 1/1974 | Hooper........................ | 180/33 A |

FOREIGN PATENTS OR APPLICATIONS

| | | | |
|---|---|---|---|
| 1,156,576 | 5/1958 | France........................ | 280/289 |
| 70,884 | 9/1959 | France........................ | 280/289 |

OTHER PUBLICATIONS

"Sissy Bar" Publication; Bel Mart Inc., Quebec, Canada; Eff. date March 14, 1968; three pages.

*Primary Examiner*—David Schonberg
*Assistant Examiner*—Michael J. Forman
*Attorney, Agent, or Firm*—Edward F. Levy

[57] ABSTRACT

A motorcycle engine guard assembly for attachment to a motorcycle frame includes a pair of U-shaped roll bar members each having mounting brackets for attachment to the motorcycle frame. A right hand roll bar member and a left hand roll bar member are provided for mounting to the right and left sides of the motorcycle frame, respectively. These members are constructed for attachment solely to the frame using the motorcycle engine mounting holes, and they are shaped to enclose and overlie vulnerable portions of the motorcycle engine.

9 Claims, 12 Drawing Figures

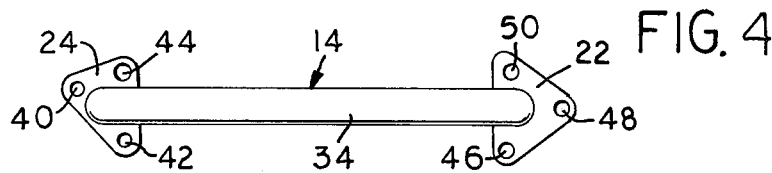
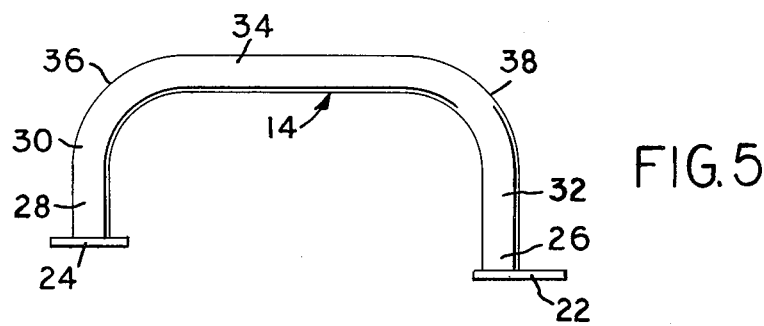
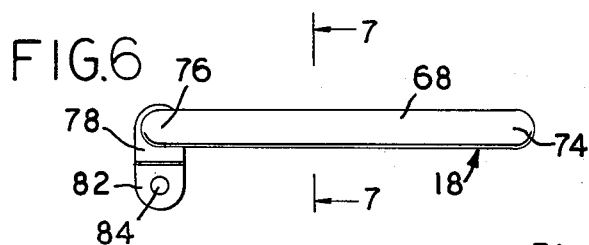
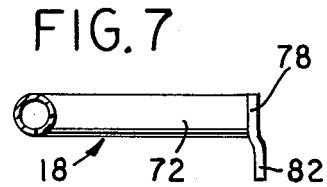
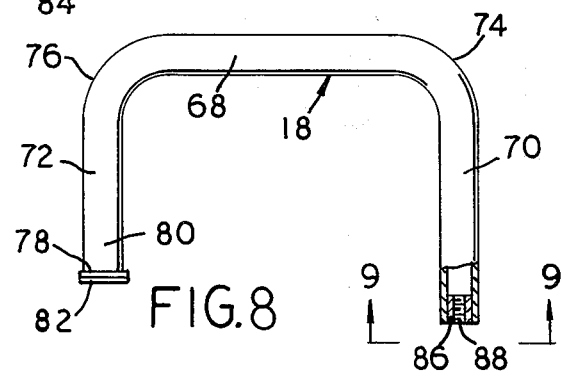
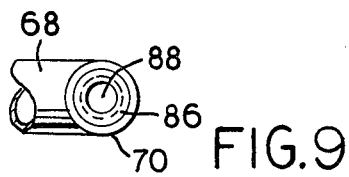
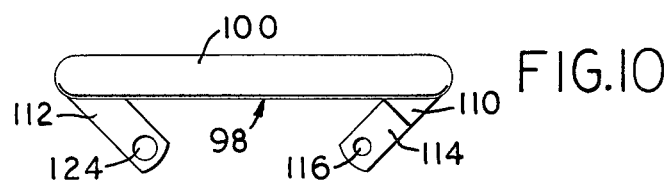
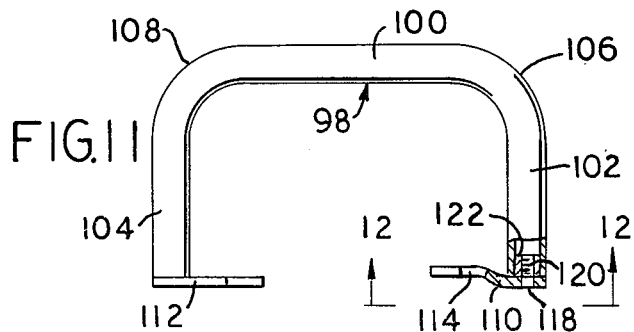
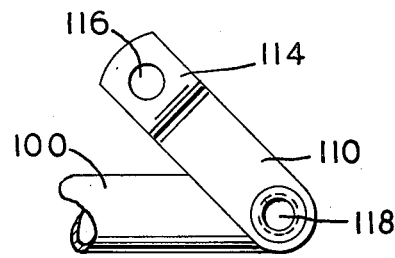

MOTORCYCLE ENGINE GUARD ASSEMBLY

The present invention relates in general to motorcycles and more particularly to a novel engine guard assembly having a right hand and a left hand member for attachment to a motorcycle frame.

Motorcycle roll bars are attached to motorcycles for the purpose of protecting vulnerable parts of the motorcycle in the event that the motorcycle falls on its side or is struck from the side. The conventional roll bar consists of a large tubular loop, made in one piece, with its top portion attached to the motorcycle frame by means of U-clamps and brackets, and with its bottom portion attached to the motorcycle engine by means of spacers. As a result of this construction, conventional roll bars have several inherent disadvantages. Vibration from the motorcycle engine is transmitted directly to the bottom of the roll bar, resulting in extreme vibration of the roll bar, metal fatigue and often failure of the roll bar. If conventional roll bars are hit, the impact will apply force directly to the engine, tending to damage the engine. In addition, because the conventional roll bar is a continuous loop, in the event that the motorcycle falls on one of its sides, the roll bar striking the ground on that side will pull the other side around causing damage to the engine and warping the motorcycle frame. Conventional roll bars are relatively large in order to mount in proper position and they project on either side a large distance beyond the confines of the motorcycle thus resulting in a degradation in maneuverability and a partial interruption in the flow of cooling air to the engine. Conventional roll bars, when mounted on a motorcycle, form a plane that is substantially perpendicular to the ground. When a motorcycle equipped with a conventional roll bar falls on its side while moving, the roll bar tends to dig in, causing additional damage and potential injury to the rider.

It is an object of the present invention to provide a motorcycle engine guard or roll bar assembly which is adapted for mounting directly to the frame of a motorcycle.

Another object of the invention is to provide a motorcycle roll bar assembly which is adapted for mounting on a motorcycle and forming an acute angle with the horizontal to prevent digging in when the motorcycle falls on its side.

Another object of the invention is to provide a motorcycle roll bar assembly which is so constructed as to conform closely to the original width of the motorcycle, yet which provides maximum protection to vulnerable portions thereof, such as the dynamo cover and the crankcase cover, as well as internal engine parts, when the motorcycle falls on its side.

Still another object of the invention is to provide a motorcycle roll bar assembly which does not interfere with the flow of cooling air to the motorcycle engine.

In accordance with the invention, there is provided a motorcycle roll bar assembly having a right hand roll bar member and a left hand roll bar member. The right hand roll bar member and the left hand roll bar members are generally U-shaped and have means disposed at their ends for attachment to the right hand and the left hand sides of a motorcycle frame, respectively. These members are, in general, not symmetrical and are designed to be spaced apart from, but generally conform to, the shape of vulnerable portions of a motorcycle such as the dynamo cover and the crankcase cover thus protecting these vulnerable portions when the motorcycle falls on its side.

Additional objects and advantages of the invention will become apparent during the course of the following specification when taken in connection with the accompanying drawings in which:

FIG. 4 is a plan view of the right hand roll bar member of the motorcycle roll bar assembly of FIG. 1;

FIG. 5 is an elevational view of the right hand roll bar member of FIG. 4;

FIG. 6 is a plan view of the left hand roll bar member of the motorcycle roll bar assembly of FIG. 1;

FIG. 7 is an end view taken along line 7—7 of FIG. 6;

FIG. 8 is an elevational view of the left hand roll bar member of FIG. 6;

FIG. 9 is a fragmentary bottom view taken along the line 9—9 of FIG. 8;

FIG. 10 is a plan view of a left hand roll bar member of a motorcycle roll bar assembly showing an alternative construction.

FIG. 11 is an elevational view of the left hand roll bar member of FIG. 10; and

FIG. 12 is a bottom view taken along the line 12—12 of FIG. 11.

Figure 1:
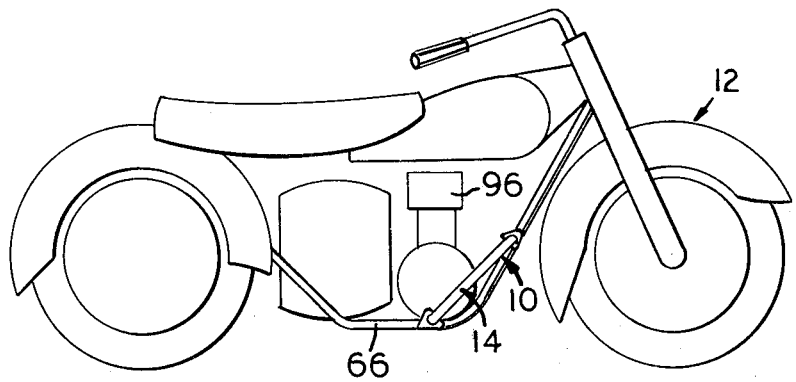
FIG. 1 is an elevational view of a motorcycle roll bar assembly, made in accordance with the present invention, shown installed on a motorcycle.
Figure 2:
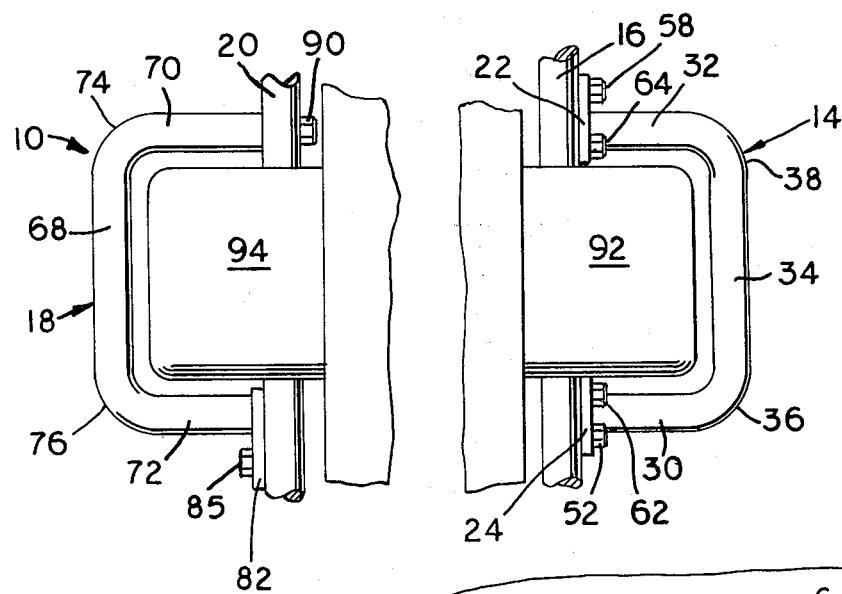
FIG. 2 is a fragmentary plan view of the motorcycle roll bar assembly of FIG. 1.
Figure 3:
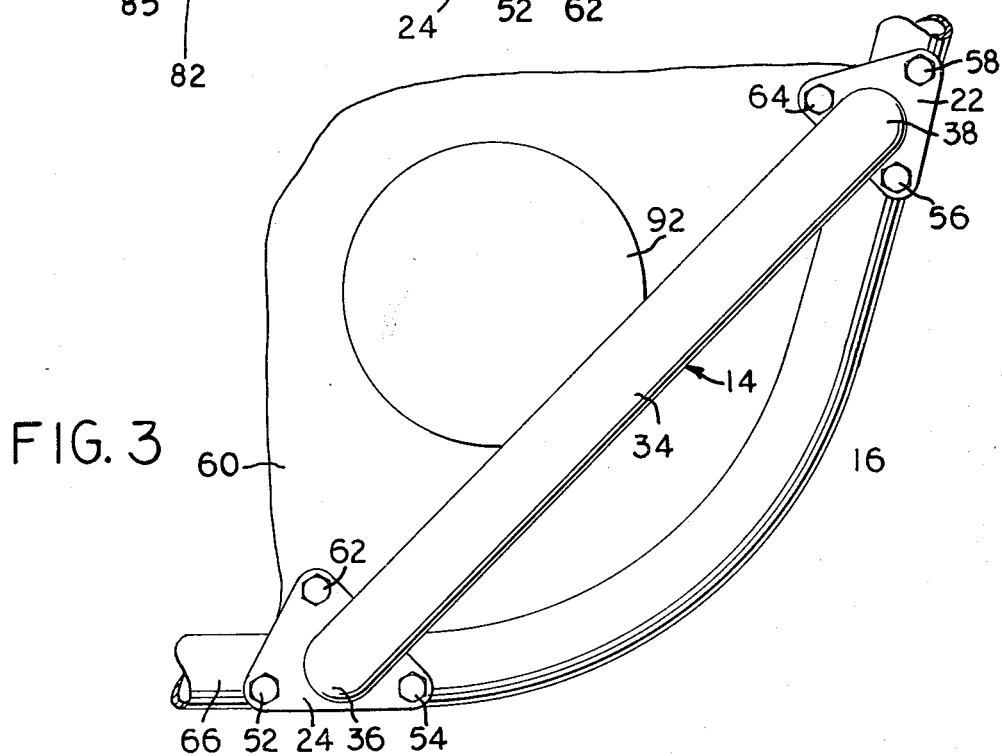
FIG. 3 is an enlarged fragmentary portion of FIG. 1 showing details of attachment of the right hand roll bar member to the motorcycle frame.

Referring in detail to the drawings, there is shown in FIG. 1 a motorcycle roll bar assembly 10, made in accordance with the present invention, and installed on a motorcycle 12. As shown in FIG. 2, the roll bar assembly 10 comprises a right hand roll bar member 14 attached to the right hand motorcycle frame member 16, and a left hand roll bar member 18 attached to the left hand frame member 20. As shown in FIG. 3, the right hand roll bar member 14 is mounted on the motorcycle frame by means of triangular mounting tabs 22 and 24, in a manner to be presently described.

The roll bar members 14 and 18 are each made of a length of tubular metal stock bent into the same general U-shape configuration, although their sizes and shapes differ slightly from one another so as to accommodate the protruding motorcycle parts they are designed to overlie. The right hand roll bar member 14 is formed of heavy metal tubing bent to form an elongated linear central section 34 terminating at each end in shorter perpendicular end sections 30 and 32. The end sections 30 and 32 are parallel to each other and are joined to the central section 34 by arcuate portions 36 and 38. The end sections 30, 32, the arcuate portions 36, 38 and the central section 34 thus form an integral unitary member 14. A suitable material for forming member 14, having adequate strength and stiffness has been found to be steel tubing with an outer diameter of approximately 1 inch and a wall thickness of approximately 14 gauge.

The triangular mounting tabs 22 and 24 are welded to the respective free ends 26 and 28 of the end sections 30 and 32 in such a manner that they extend perpendicularly to the axis of said end sections. When mounted on the motorcycle frame, the mounting tab 22 is located at a level above the tab 24, and the mounting tab 24 is therefore referred to as the lower mounting tab.

As shown in FIG. 4, the lower triangular mounting tab 24 includes holes 40, 42 and 44. A line drawn between holes 40 and 42 forms an acute angle with the central section 34 of roll bar member 14. A preferred value for this angle is approximately 45°. The upper triangular mounting tab 22 includes holes 46, 48 and 50. A line drawn between holes 46 and 48 forms an acute angle with the central section 34. When installed on the right hand frame member 16, holes 40, 42, 46 and 48 are used to attach the triangular mounting tabs 22 and 24 to the frame member 16 by means of bolts 52, 54, 56 and 58 (FIG. 3). Holes 44 and 50 are used to mount the motorcycle engine 60 on the frame by means of bolts 62 and 64. Prior to the installation of the right hand roll bar member 14, the standard brackets, which are normally supplied with the motorcycle to attach the motorcycle engine 60 to the frame member 16, are removed and replaced by the triangular tabs 22 and 24.

As shown in FIGS. 1 and 3, the lower portion 66 of the right hand motorcycle frame member 16 is substantially horizontal, and the central section 34 of the installed right hand roll bar member 14 forms an angle with the horizontal of approximately 45°. This angle permits the motorcycle 12 to skid forward in the event that it falls onto the right hand roll bar member 14 rather than dig into the ground. Thus, the main central body portion of the roll bar member 14 is disposed at an angle of 45 degrees to the longitudinal axis of the motorcycle, which angle has been found to be optimum for purposes of safety and protection of the motorcycle parts as well as for purposes of ease of installation, strength and economy of manufacture. However, the mounting of the roll bar member at other angles ranging from 30° to 60° will also achieve beneficial results.

The end sections 30 and 32 are in general unequal in length in order to closely fit protruding portions of the motorcycle engine. The lengths of the end sections and central section will vary according to the particular model motorcycle for which the roll bar member is intended. An optimum spacing between the protruding portions of the motorcycle engine and the overlying central section 34 has been formed to range from approximately three-fourths inch to 1 inch.

As previously indicated, the left hand roll bar member 18 of the motorcycle roll bar assembly 10 is of the same general U-shaped configuration as the right hand roll bar member 14, although its dimensions may vary to conform to the projecting portions on the left hand side of the motorcycle. FIG. 2 shows the manner in which the left hand roll bar member 18 is mounted on the left hand motorcycle frame member 20.

The left hand roll bar member 18 has a linear central section 68 bent to terminate in perpendicular end sections 70 and 72 which are joined thereto by arcuate corner portions 74 and 76. In mounted position, the end section 70 is located at a higher level than end section 72, with the central section 68 inclined downwardly between the end sections at an angle of approximately 45°.

In FIGS. 6 and 8, the left hand roll bar member 18 is shown as including a generally rectangular mounting bracket 78 which is welded to the free end 80 of lower end section 72 and extends perpendicularly to the axis of end section 72. Bracket 78 has a free end portion 82 which is stepped downwardly and contains a mounting hole 84 sized to receive a bolt 85 (FIG. 2) for securing end section 72 to the left hand motorcycle frame member 20.

In the embodiment of the roll bar assembly 10 illustrated, the model of motorcycle, for which the assembly is intended, does not permit the use of a mounting bracket at the end of the upper end section 70. Instead, the free end of the upper end section 70 is fitted with a cylindrical metal block 86 having a central threaded bore 88. Block 86 is welded within the hollow tubular end of the upper end section 70. The threaded bore 88 receives a bolt 90 which passes through a pre-formed hole in the left hand motorcycle frame 20, as shown in FIG. 2.

FIGS. 2 and 3 illustrate the manner in which the roll bar member 14 extends across the body of the motorcycle distributor cover case 92, which also encloses the point assembly and end of the crankshaft at the right hand side of the motorcycle. In a similar manner, the roll bar member 18 extends across the body of the engine case cover 94 at the left hand side of the motorcycle, and also overlies and protects the motorcycle gear shift lever (not shown). These motorcycle parts project from the sides of the motorcycle and are particularly vulnerable to damage when the motorcycle falls on either side.

It will be appreciated that since each roll bar member 14 and 18 is mounted independently of the other on a respective side of the motorcycle, and is mounted wholly on the motorcycle frame without any direct connection to the engine, said roll bar members are extremely effective in protecting the vulnerable engine parts on both sides of the motorcycle. The impact from a spill or collision is absorbed entirely by the motorcycle frame, which is the strongest structural part of the motorcycle. Further, the arcuately bent, U-shaped roll bar members are sized and dimensioned for optimum strength, so that they resist bending, warping or twisting under impact.

As shown in FIG. 1, both the right hand and the left hand roll bar members 14, 18 are mounted below the cooling fins 96 of the motorcycle engine 60. Thus, the roll bar members are so located as to avoid interference with the flow of cooling air to the cooling fins 96.

Although there is considerable variation in the detail design of various motorcycles, it is standard practice to use engine mounting means comprising flanges and brackets which are bolted to the motorcycle frame members. The end configurations of the right hand and left hand roll bar members have been shown by way of example. It is within the scope of the present invention to provide, in alternative embodiments, various end brackets for right hand and left hand roll bar members to accommodate the configurations of various motorcycle models.

One of such alternative embodiments is shown in FIG. 10 incorporated in an alternative left hand roll bar member 98. In this embodiment, the left hand roll bar member 98 is again of U-shape configuration, having a central section 100, an upper end section 102 and a lower end section 104. The end sections are joined to the central section 100 by respective curved corner portions 106 and 108. The roll bar member 98 also includes an upper mounting bracket 110 welded to the free end of end section 102 and extending perpendicularly therefrom, and a lower mounting bracket 112 welded to the free end of end section 104 and extending perpendicularly therefrom.

The upper mounting bracket 110 has an upwardly stepped free end portion 114 containing a mounting hole 116. In addition, the upper mounting bracket 110 contains another mounting hole 118 at its welded end. This hole 118 registers with a threaded bore 120 formed in a cylindrical metal block 122 welded within the interior of the end section 102.

The lower mounting bracket 112 is flat, and at its free end contains a mounting hole 124. The holes 116, 118 and 124 are used to attach the alternative left hand roll bar member 98 to the frame of a motorcycle, using holes in the frame of the motorcycle provided for attachment of motorcycle engine mounting brackets. The upper mounting bracket 110 and the lower mounting bracket 112 each form an acute angle with the central section 100, and their axes are substantially perpendicular to each other. When the roll bar member 98 is installed on a motorcycle frame, the central section 100 is inclined at an angle of approximately 45° with the horizontal axis of the motorcycle.

While preferred embodiments of the invention have been shown and described herein, it is obvious that numerous omissions, changes and additions may be made in such embodiments without departing from the spirit and scope of the invention.

What is claimed is:

1. A motorcycle roll bar assembly for attachment to a motorcycle frame having a plurality of engine mounting holes, said assembly comprising a U-shaped right hand roll bar member having a pair of end sections and an elongated, linear central section disposed between said end sections, right hand attachment means disposed on said end sections for the purpose of attaching said right hand roll bar member to the right hand side of said motorcycle frame at the engine mounting area of the frame, using said engine mounting holes, a U-shaped left hand roll bar member having a pair of end sections and an elongated, linear central section disposed between said end sections, and left hand attachment means disposed on said end sections for the purpose of attaching said left hand roll bar member to the left hand side of said motorcycle frame at the engine mounting area of the frame, using said engine mounting holes, each of said roll bar members being formed of heavy metal tubing with said end sections disposed substantially parallel to each other and said elongated, linear central section disposed substantially perpendicular to said end sections, and a curved portion joining each of said end sections with adjacent portions of said central section, said roll bar members being sized and shaped to locate the respective central sections in positions in which they closely overlie vulnerable, laterally projecting motorcycle engine parts when said roll bars are attached to the respective opposite sides of the motorcycle frame, with said central sections extending at an acute angle to the longitudinal axis of said motorcycle.

2. A motorcycle roll bar assembly according to claim 1 in which said attachment means comprise brackets having holes located to register with said engine mounting holes in said motorcycle frame for bolting said roll bars to said frame in the engine mounting area thereof.

3. A motorcycle roll bar assembly according to claim 1 in which said attachment means include means defining a threaded hole for bolting to said engine mounting holes in said motorcycle frame.

4. A motorcycle roll bar assembly according to claim 1 in which said central sections and said end sections are formed of bent hollow steel tubing.

5. A motorcycle roll bar assembly according to claim 1 in which said attachment means include triangular brackets each having three holes with the plane of said brackets disposed perpendicularly to said end sections.

6. A motorcycle roll bar assembly according to claim 1 in which said attachment means are located to attach said right hand roll bar member and said left hand roll bar member to said frame in such a position that said central sections are disposed at an angle of approximately 45° to the horizontal.

7. A motorcycle roll bar assembly according to claim 1 in which said attachment means are located to attach said right hand roll bar member and said left hand roll bar member to said frame in such a position that said central sections are disposed at an angle to the horizontal within the range of from 30° to 60°.

8. A motorcycle roll bar assembly according to claim 1 in which the central section of one of said roll bars is positioned to overlie the engine case cover projecting laterally from one side of the motorcycle, and the central section of the other roll bar is positioned to overlie the crankcase cover projecting laterally from the other side of the motorcycle.

9. A motorcycle roll bar assembly according to claim 1 in which said central sections are spaced outwardly from the underlying vulnerable, laterally projecting motorcycle engine parts by a distance between three quarters of an inch and 1 inch.

* * * * *